United States Patent
Lüthard et al.

(10) Patent No.: US 10,619,270 B2
(45) Date of Patent: Apr. 14, 2020

(54) PRODUCTION CONTROL IN A BLOW ROOM

(71) Applicant: Maschinenfabrik Rieter AG, Winterthur (CH)

(72) Inventors: Reto Lüthard, Winterthur (CH); Gerhard Gschliesser, Winterthur (CH)

(73) Assignee: Maschinenfabrik Rieter AG, Winterthur (CH)

( * ) Notice: Subject to any disclaimer, the term of this patent is extended or adjusted under 35 U.S.C. 154(b) by 13 days.

(21) Appl. No.: 16/003,155

(22) Filed: Jun. 8, 2018

(65) Prior Publication Data
US 2018/0355519 A1 Dec. 13, 2018

(30) Foreign Application Priority Data

Jun. 8, 2017 (CH) ......................................... 741/17

(51) Int. Cl.
| | |
|---|---|
| *D01G 23/04* | (2006.01) |
| *D01G 23/08* | (2006.01) |
| *D01G 21/00* | (2006.01) |
| *D01G 31/00* | (2006.01) |
| *G05B 19/4155* | (2006.01) |

(Continued)

(52) U.S. Cl.
CPC ............ *D01G 23/04* (2013.01); *D01G 21/00* (2013.01); *D01G 23/06* (2013.01); *D01G 23/08* (2013.01); *D01G 31/006* (2013.01); *G05B 19/4155* (2013.01); *D01G 7/00* (2013.01);

(Continued)

(58) Field of Classification Search
None
See application file for complete search history.

(56) References Cited

U.S. PATENT DOCUMENTS

| | | | | |
|---|---|---|---|---|
| 4,338,351 A | * | 7/1982 | Bloom ................. | H01C 17/265 29/620 |
| 4,369,563 A | * | 1/1983 | Williamson ......... | B23Q 7/1426 198/346.1 |

(Continued)

FOREIGN PATENT DOCUMENTS

| | | |
|---|---|---|
| CH | 670 257 A5 | 5/1989 |
| DE | 31 51 697 A1 | 7/1983 |

(Continued)

OTHER PUBLICATIONS

Swiss Patent Office Search Report, dated Sep. 22, 2017.

*Primary Examiner* — Ramesh B Patel
(74) *Attorney, Agent, or Firm* — Dority & Manning P.A.

(57) ABSTRACT

A system and corresponding method are provided for controlling production in a blow room, the blow room including a controller, a supplying machine having a supplying part, and a machine to be supplied that has a filling level measurement. The supplying machine and the machine to be supplied are connected to the controller. A production area is defined for the supplying machine and includes a minimum production and a maximum production. Production of the supplying part of the supplying machine is determined based on a filling level of the filling level measurement. When production of the production area drops below the minimum production, the supplying part of the supplying machine is shut down, the shutdown taking place independently of the filling level of the machine to be supplied.

11 Claims, 1 Drawing Sheet

(51) Int. Cl.
*D01G 23/06* (2006.01)
*D01G 15/02* (2006.01)
*D01G 7/00* (2006.01)
*D01G 9/00* (2006.01)
*D01G 13/00* (2006.01)

(52) U.S. Cl.
CPC .............. *D01G 9/00* (2013.01); *D01G 13/00* (2013.01); *D01G 15/02* (2013.01); *G05B 2219/45238* (2013.01)

(56) References Cited

U.S. PATENT DOCUMENTS

| | | | | | |
|---|---|---|---|---|---|
| 4,559,681 | A | * | 12/1985 | Coquillart | B23Q 7/1415 29/26 A |
| 4,723,344 | A | * | 2/1988 | Leifeld | D01G 13/00 19/105 |
| 4,876,769 | A | * | 10/1989 | Schlepfer | D01G 21/00 19/105 |
| 4,982,827 | A | * | 1/1991 | Seitz | B23Q 7/035 198/341.07 |
| 5,143,485 | A | * | 9/1992 | Faas | D01B 3/025 406/14 |
| 5,161,111 | A | * | 11/1992 | Oehler | D01G 21/00 57/264 |
| 5,224,243 | A | * | 7/1993 | Schlepfer | D01G 23/08 19/205 |
| 5,646,870 | A | * | 7/1997 | Krivokapic | G03F 7/70625 700/117 |
| 6,293,778 | B1 | * | 9/2001 | Joseph | B29C 48/92 425/72.1 |
| 2016/0108558 | A1 | * | 4/2016 | Schmid | D01G 7/14 19/80 R |
| 2016/0108559 | A1 | * | 4/2016 | Schmid | D01G 7/14 19/80 R |
| 2018/0355520 | A1 | * | 12/2018 | Wolfer | B65G 11/20 |

FOREIGN PATENT DOCUMENTS

| | | |
|---|---|---|
| DE | 3 244 619 A1 | 10/1983 |
| DE | 32 37 864 A1 | 4/1984 |
| DE | 31 53 359 C2 | 4/1991 |
| EP | 0 311 831 A1 | 4/1989 |
| EP | 0 548 023 A1 | 6/1993 |
| GB | 1 231 636 A | 5/1971 |
| GB | 2 132 382 A | 7/1984 |

\* cited by examiner

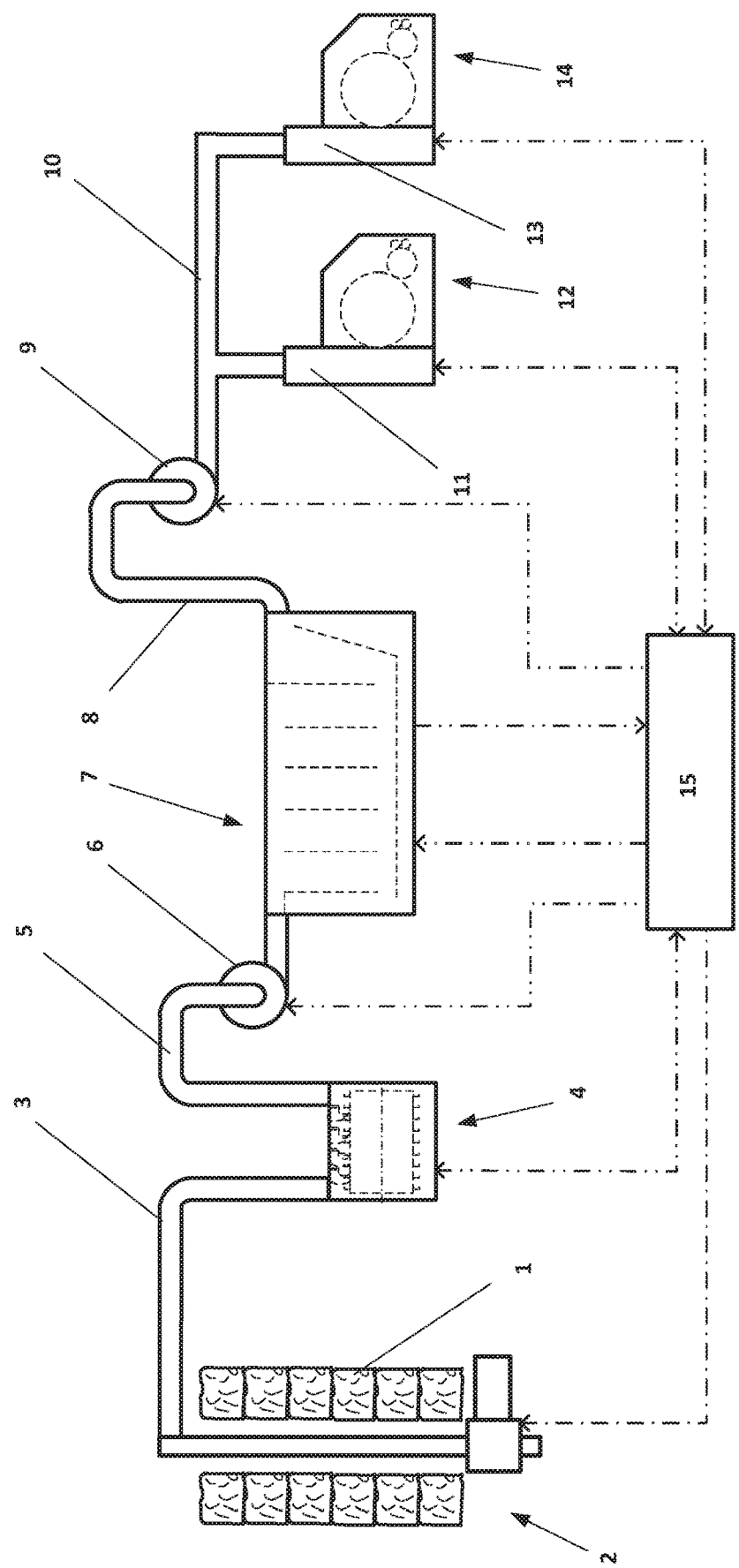

PRODUCTION CONTROL IN A BLOW ROOM

FIELD OF THE INVENTION

The invention relates to a method and a device for controlling production in a blow room.

BACKGROUND

Fiber processing machines, such as cleaners, temporary storage devices, mixers or cards are used in the blow room for cleaning, mixing and separation of the fiber material into individual fibers as well as parallelization of the fibers.

In a blow room, the fibers to be processed for the spinning mill pass through a plurality of processing stages. In the first stage, the fibers are separated in the form of fiber flocks from fiber bales. So-called bale openers are mostly used for this purpose. These fiber flocks are removed from the bale opener by means of a pneumatic conveyor device and sent to a downstream cleaning machine. The pneumatic conveyor device consists essentially of a pipeline and a fan to create the required stream of conveyor air. The cleaned fiber flocks are in turn sent pneumatically from the cleaning machine to a mixer. The fiber flocks are then conveyed from the mixer by means of an additional transport section to a card, which separates the fiber flocks into individual fibers and then forms them into a fiber sliver.

The arrangement of individual machines in a blow room may be embodied in various ways, depending on the raw material to be processed and the product to be produced, among other things. For example, coarse cleaners and fine cleaners may be used, or temporary storage devices may also be used. A supplying machine in the sense of this patent application is a machine dispensing fiber material to a conveyor system. For transfer of the fiber material, the supplying machine comprises a supplying part. A machine to be supplied receives the fiber material. The machine to be supplied processes the received fiber material and, under some circumstances, can transfer it in turn to another conveyor system via a supplying part. Conveyance between machines is usually accomplished pneumatically in a stream of conveyor air generated by a fan. Simple machines, for example, metal separators, foreign material detection systems and foreign fiber detection systems or simple cleaners, which interrupt the conveyor line by their shape but do not suppress the actual conveyor stream, are integrated into the transport system and therefore also do not have any supplying part. The needs of the individual machines at the beginning, at the end and in the conveyor system must be met by the stream of conveyor air and/or a certain conveyor performance or production in order to have smooth functioning and also to meet the demand for a certain conveyor performance.

DE 31 51 697 A1 relates to the control of the charging of machines to be supplied for processing fiber material. The part of the machine to be supplied is regulated on the basis of the requirement of the machine to be supplied. The demand and thus production of the supplying machine are calculated on the basis of the filling level of the machine to be supplied. The machines set up between the supplying machine and the machine to be supplied are operated at the same speed. As a result of this regulation, downtimes of blow room machines are prevented. However, it is a disadvantage that even small amounts of fiber material are conveyed from the supplying machine to the machines to be supplied by means of machines in between. This does not take into account a minimum production which is necessary for a uniform quality in processing due to the speed set on the machine in between.

CH 670 257 A5 also teaches that the production level of a part to be supplied, belonging to a supplying machine, should be regulated by the demand of a machine to be supplied. Optimal operation of the machines in between is not taken into account in this process.

Stop-and-go operation is also known from the state of the art. In this type of operation, the supplying parts of the supplying machines are turned on and off on the basis of the demand of the machines to be supplied. This permits operation of the machine set up between the supplying machine and the machine to be supplied, each one at the same production level. However, the frequent start-up and stopping operations, which can lead to breakdowns due to unstable operating conditions or blockages within the individual machine, are a disadvantage.

SUMMARY OF THE INVENTION

An object of the invention is thus to create a method and a device for controlling production in a blow room, which will allow operation of the individual machines in a respective production area to ensure a high quality and operational reliability. Additional objects and advantages of the invention will be set forth in part in the following description, or may be obvious from the description, or may be learned through practice of the invention.

The objects are achieved by the features described and claimed herein.

To achieve the objects, a novel method and the respective device for controlling production are proposed. This production takes place in a blow room comprising a controller and at least one supplying machine and at least one machine to be supplied, and comprising a supplying part. The machine to be supplied has a filling level measurement. The machines are connected to the controller. For each supplying machine, a production area with a minimum production and a maximum production are defined. The machine to be supplied determines the production of the supplying part of the supplying machine based on the filling level. If production drops below the minimum production, the supplying part of the supplying machine is shut down, the shutdown occurring regardless of the filling level of the machine to be supplied.

The machines to be supplied, such as a mixer or cards, are operated at a certain production volume and usually have filling chutes. The filling chutes are provided with filling level measurements. Fiber flocks are required by the supplying machine based on the filling level and the variations therein. The supplying machine has a supplying part, which responds to this demand and makes available the desired quantity of fiber flocks in accordance with demand. Production within the production area is determined by the machine to be supplied, and thus production within the production area is regulated. If the required amount of fiber flocks drops below the minimum production provided for continuous operation, the supply is interrupted and operation of the supplying part of the supplying machine is shut down. This avoids operating the supplying machine in a range which is not optimal for the supply.

The production area is determined by additional fiber processing machines situated between the supplying machine and the machine to be supplied. The minimum production and the maximum production, and thereby the production area in between, are determined, for example, by the adjustment of a cleaner located between the supplying machine and the machine to be supplied. With its adjustment, the cleaner is suitable for a certain production area. If production drops below a minimum production or exceeds a maximum production because of the amount required by the machine to be supplied, this affects the quality and operational reliability of the cleaner. The production area and thus the minimum production and maximum production can be shifted by a change in adjustment. This is also true of other machines installed between the supplying machine and the machine to be supplied, such as the separators for heavy parts or metal, for example.

If maximum production is achieved through this demand, so that the required filling level cannot be maintained in a machine to be supplied, for example, a card, there is advantageously the possibility of influencing the production by the machine to be supplied or the card, respectively, or shutting down individual machines to be supplied and/or cards, respectively. This results in recovery of the filling levels. Such an association has the advantage that it prevents the machines that are to be supplied from running empty and, in conjunction with this, prevents a loss of production due to the required resumption of operation from the empty condition. The result is also an increased operational reliability of the machine to be supplied.

The maximum production can also be predetermined by the machine to be supplied itself. In this case a requirement of the machine to be supplied, which is greater than the maximum production, cannot be met and it is also impossible to change the production area.

Through appropriate equipment and automation of the additional fiber processing machine situated between the supplying machine and the machine to be supplied, in the event of a change in the production area, it is possible to automatically reset the additional fiber processing machine located between the supplying machine and the machine to be supplied. Any change in the production area indicates a shift in the minimum production and/or the maximum production. If, after a period of time after a temporary shutdown in supply by the controller, a demand for fiber flocks by the machine to be supplied is detected, based on a low filling level with a production volume above the minimum production, then the machine to be supplied is capable of turning the supplying part of the supplying machine back on again by means of the controller.

Due to this procedure, operation of the entire blow room in an optimum range for all the machines involved is ensured, and the highest possible quality and operational safety in production are achieved.

The controller stores and evaluates the production values of the supplying machine and the machine to be supplied as well as the period of time between shutdown of the supplying machine and reduced production or shutdown of the machine to be supplied. Because of this, the controller makes an adjustment in production and/or changes the production area to minimize any required shutdowns. Depending on the automation of the machines, possible improvements are proposed by the controller or the necessary changes in the adjustment of the various machines are proposed on the basis of a change in the production area and then can be implemented by the operator. When there is a high level of automation, the changes are ordered by the controller and implemented automatically by the machine.

A device for carrying out the method described above is also proposed. This device includes a controller and at least one supplying machine and at least one machine to be supplied. The machine to be supplied has a filling level measurement, and the machines are connected to the controller. For each machine to be supplied, a production area with a minimum production and a maximum production can be established in the controller, with production of the supplying part of the supplying machine determined by the machine to be supplied on the basis of the filling level. If production drops below the minimum production, a shutdown of a supplying part of the supplying machine is provided, regardless of the filling level of the machine to be supplied. The controller may be implemented as a central controller, wherein a certain controller of a machine can take over the functions of a central controller. Accordingly, the machines are electronically linked to one another.

The production area is determined by additional fiber processing machines located between the supplying machine and the machine to be supplied. These machines, which do not have any direct influence on the production level but instead are passively tied into the fiber transport path from the supplying machine to the machine to be supplied, operate reliably only in a certain production area. An expansion of or change in the production area usually requires a change in the setting of these machines to be able to manufacture a high-quality product. To prevent any loss of quality and operational reliability, shutdown of the supply is provided when production drops below the minimum production.

A change in the production area can be made by changing the settings. Such a change may be necessary or desired, for example, due to a change in the fibers to be processed or an adjustment in the quality of the fibers processed. Likewise, however, the controller may suggest a change in the production area, based on an accumulation of shutdown events. Means by which a new adjustment of the additional fiber processing machine located between the supplying machine and the machine to be supplied can be carried out by the controller when there is a change in the production area are preferred. Optimization of the process can therefore be carried out by the controller itself. The prerequisite for this is a sufficiently high level of automation of the individual machines, which includes the necessary means, such as servo motors, linear drives or other measurement and adjustment devices, for example.

Various production areas are advantageously saved in the controller for various settings of the additional fiber processing machine located between the supplying machine and the machine to be supplied. It is therefore possible that, the supply to a corresponding production area is managed by relaying the adjustment that has been made to the controller. The adjustment may be relayed by the operator or by the machine itself, if there is a sufficiently high level of automation.

BRIEF DESCRIPTION OF THE FIGURE

The invention is explained in greater detail below on the basis of FIG. 1, which is a schematic diagram of machines in a blow room.

DETAILED DESCRIPTION

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

FIG. 1 shows a schematic diagram of an example of an arrangement of machines in a blow room. This diagram shows simplified equipment for a blow room, which in many cases consists of additional machines in a wide variety of arrangements.

At the start, there is a bale opener 2, which takes fiber flocks from fiber bales 1 that have already been made ready and sends them to a transport line 3. The fiber flocks are then sent through the transport line 3 to a cleaner 4. After passing through the cleaner 4, the fiber flocks are transferred through another transport line 5 and a fan 6 to a mixer 7. The fan 6 ensures the necessary stream of conveyor air for transporting the fiber flocks from the bale opener 2 via the cleaner 4 to the mixer 7. The bale opener 2, the cleaner 4, the fan 6 and the mixer 7 are connected to a controller 15. The bale opener 2 is a supplying machine and the mixer 7 is a machine to be supplied. The cleaner 4 is a machine located between the supplying machine and the machine to be supplied. The cleaner 4 has a certain adjustment of its organs, ensuring a high-quality cleaning of the fiber flocks and a high operational reliability in a certain production area. This production area with a minimum production and a maximum production is known to the controller 15, and the controller 15 can calculate data transmitted from the cleaner 4. Depending on the filling level of the mixer 7, the controller 15 regulates production of the supplying part of the bale opener 2. If this production drops below the predetermined minimum production, the controller 15 shuts down the bale opener. If production and/or demand exceed(s) the maximum production, the mixer 7 is throttled or shut down in its production accordingly in order to prevent it from running empty. A simultaneous shutdown of the fan 6 is not absolutely necessary. By steady removal of fiber flocks from the mixer 7, the demand increases again and then drops again in the production area, whereupon the controller 15 turns on the bale opener 2 again.

The mixer 7 also comprises a supplying part for passing the mixed fiber flocks to cards 12 and 14, for example. These fiber flocks are transferred through the transport lines 8 and 10 as well as the fan 9. The cards 12 and 14 are each provided with filling chutes 11 and 13. Production of the supplying part of the mixer 7 is regulated on the basis of the filling levels in the filling chutes 11 and 13. When there is a standstill of the card 12 and a low demand of card 14, it is possible for production to drop below a minimum production, which is necessary to maintain the required operational reliability. In this case, the supplying part of the mixer 7 is stopped by the controller 15 and activated again by the controller 15 after an increase in demand in a defined production area. However, if the demand of cards 12 and 14 exceeds the maximum production, then the controller 15 acts on the cards 12 and 14 to reduce their production or shut down one of the cards 12 or 14.

Modifications and variations can be made to the embodiments illustrated or described herein without departing from the scope and spirit of the invention as set forth in the appended claims.

LEGEND

1 Fiber bales
2 Bale opener
3, 5, 8 Transport line
4 Cleaner
6, 9 Fan
7 Mixer
10 Distributor
11, 13 Filling chute of card
12, 14 Card
15 Controller

The invention claimed is:

1. A method for controlling production in a blow room, the blow room including a controller, a supplying machine that dispenses fiber material to a conveyor via a supplying part associated with the supplying machine; and a receiving machine supplied with the fiber material from the conveyor, the receiving machine having a filling level measurement, wherein the supplying machine and the receiving machine are connected to the controller, the method comprising
    defining a production area for the supplying machine having a minimum production and a maximum production for the supplying machine;
    determining production of the supplying part of the supplying machine based on a filling level of the filling level measurement of the receiving machine; and
    when production of the production area drops below the minimum production, the supplying part of the supplying machine is shut down, the shutdown taking place independently of the filling level of the receiving machine.

2. The method according to claim 1, wherein the production area includes one or more additional fiber processing machines operationally located between the supplying machine and the receiving machine.

3. The method according to claim 2, further comprising adjusting operation of the one or more additional fiber processing machines when there is a change in the production of the production area.

4. The method according to claim 1, wherein the production of the production area is determined by the receiving machine.

5. The method according to claim 4, wherein the receiving machine is configured to turn on the supplying part of the supplying machine via the controller based on a low filling level at the receiving machine.

6. The method according to claim 1, wherein when the production of the production area exceeds the maximum production, the controller alters production of the receiving machine or shuts down the receiving machine.

7. The method according to claim 1, wherein the controller saves production values of the receiving machine, and saves and evaluates periods of time between shutdowns of the supplying machine, the controller determining an adjustment in the production of the production area in order to minimize the shutdowns.

8. A system or controlling production in a blow room, comprising:
    a controller;
    a supplying machine configured to dispense fiber material to a conveyor via a supplying part associated with the supplying machine, wherein a production area is defined for the supplying machine in the controller having a minimum production and a maximum production;
    a receiving machine that is supplied with the fiber material from the conveyor, the receiving machine comprising a filling level measurement;
    the supplying machine and the receiving machine in operative communication with the controller; and
    the controller configured to operate the supplying machine and the receiving machine such that production of the supplying part of the supplying machine is determined based on a filling level of the filling level measurement of the receiving machine; and when production of the production area drops below the minimum production, the supplying part of the supplying machine is shut down, the shutdown taking place independently of the filling level of the receiving machine.

9. The system according to claim 8, further comprising one or more additional fiber processing machines operationally located in the production area and in operational communication with the controller.

10. The system according to claim 9, wherein the controller is configured to adjust operation of the one or more additional fiber processing machines when there is a change in the production of the production area.

11. The system according to claim 9, wherein the controller stores various settings of the additional fiber processing machines corresponding to different productions of the production area.

\* \* \* \* \*